United States Patent [19]
Berman

[11] Patent Number: 5,610,665
[45] Date of Patent: Mar. 11, 1997

[54] INTERACTIVE TELEVISION GRAPHICS INTERFACE

[76] Inventor: John L. Berman, 485 Quincy Ave., Mountain View, Calif. 94043

[21] Appl. No.: 360,625

[22] Filed: Dec. 21, 1994

Related U.S. Application Data

[63] Continuation-in-part of Ser. No. 136,562, Oct. 12, 1993.
[51] Int. Cl.$^6$ ..................................................... H04N 5/445
[52] U.S. Cl. ............................................. 348/564; 348/589
[58] Field of Search ..................................... 348/564, 553, 348/473, 565, 589, 581, 600, 12, 13; 345/199, 150; H04N 5/445, 9/64

[56] References Cited

U.S. PATENT DOCUMENTS

| | | | |
|---|---|---|---|
| 5,089,811 | 2/1992 | Leach | 345/199 |
| 5,220,312 | 6/1993 | Lumelsky et al. | 345/150 |
| 5,233,423 | 8/1993 | Jernigan | 348/565 |
| 5,270,800 | 12/1993 | Sweet | 348/473 |

Primary Examiner—Victor R. Kostak
Attorney, Agent, or Firm—Robert Platt Bell & Associates, P.C.

[57] ABSTRACT

Apparatus for use with standard television (TV) for superimposing images, captions, titles, or other information over the television scene. Synchronization of the superimposed images with the television scene is brought about by phase locking the images to the horizontal synchronization pulse train of the television scene. A joystick input device allows the television viewer to select from a library of superimposed images and to move the images to any location over the television scene. The viewer may continue to move the superimposed images over the television scene to set up and maintain humorous or other expressive effects. The apparatus can also be used as an educational tool in conjunction with appropriate broadcasted or recorded programming. Closed-graphics information received with a television signal may generate and control locally generated graphic overlay images to provide interactive gaming or educations applications. The horizontal synchronization pulse train of the television scene can be modified by introducing variable time delays from one pulse to the next. This variable synchronization delay can be used to create fun-house mirror effects.

17 Claims, 4 Drawing Sheets

INTERACTIVE TELEVISION GRAPHICS INTERFACE

CROSS-REFERENCE TO RELATED APPLICATIONS

This application is a Continuation-in-Part (CIP) application of Ser. No. 08/136,562, filed Oct. 12, 1993.

TECHNICAL FIELD

The present invention pertains to methods and apparatus for superimposing images over television scenes and interaction with television, including video and television games. In particular, the present invention includes a system and process in which television supplemental data may be embedded in a televised broadcast, decoded and displayed by a graphic overlay display system in the home of the television viewer. Such supplemental data may include television graphic overlays which may highlight portions of background video and/or provide questions, answers, rewards, and clues used, for example, in a Socratic method teaching supplement to regular television programming. A local graphic display system may include a joystick input device which the viewer may use to respond to a question such as a multiple-choice question. Supplemental data might also include a correct answer and graphical reward or clue, whose display may depend on whether the answer provided is correct or incorrect.

DESCRIPTION OF PRIOR ART

People want to interact with everything around them. We are visual beings, and we live in a visual society. Television imagery is one of the primary means of communication in today's world. Communication through television has traditionally been a passive activity for a viewer, whose television viewing frequently may comprise watching images of someone else's making, over which the viewer has no control.

A viewer may have strong emotional reactions to what may be seen on television whether watching a newscast, sporting event, commercial advertisement, or any other stimulating program. Such strong emotional reactions may be frequently critical in nature or of a humorous bent, and many viewers may desire to vent their reactions by directing invective or derisive humor at their television. In the prior art, a viewer's options for expressing his discontent or pleasure have been limited to oral or physical expressions which may tend to elevate a viewer's level of tension or lead to physical damage of the television. It may be desirable to offer an alternative and novel means of expression to the traditional avenues mentioned above.

So-called interactive television systems have been promoted for providing a viewer with control over various aspects of television viewing or to allow a user to interact with his television and/or provide ancillary services through a television. Such prior art systems may rely upon more expensive computer hardware for generating display data or receiving data from a viewer. In addition, such systems may rely upon a return path for viewer data (e.g., cable return path, FM subcarrier, telco dialup or the like).

While such systems may be useful in providing interactive services (home banking or the like) the expense of sophisticated microprocessor systems and return path communications links may make such systems unaffordable, particularly for certain applications. For example, for educational or gaming applications, hardware may be particularly price sensitive.

Interactive systems are known in the art for providing a user interactive display without the use of a return path communications link. One example of such a system is shown, for example, in U.S. Pat. No. 4,977,455, issued Dec. 11, 1990 to Young, entitled "System and Process for VCR Scheduling", U.S. Pat. No. 4,706,121, issued Nov. 10, 1987 to Young, entitled "TV Schedule System and Process", and U.S. Pat. No. 5,151,789, issued Sep. 29, 1992 to Young, entitled "System and Method for Automatic Unattended Recording of Cable Television Programs", all three of which are incorporated herein by reference.

The Young patents disclose a system commercially marketed under the trademark Starsight™ for providing television scheduling information for a viewer. Television scheduling information may be transmitted as supplemental data during the vertical blanking interval (VBI) during non-video horizontal lines. Such information may be decoded and stored in a memory and retrieved by a user through a video display. While such a system may be suitable for displaying text information such as television scheduling, the complexity of such a system may make it unsuitable for educational or gaming applications.

Further, the Young system displays text information as a separate video display, and thus may not be capable of superimposing graphics or text over a background video display. Moreover, the Young system may not be capable of providing a method of displaying supplemental graphics or text which may relate directly or indirectly to a background television picture.

SUMMARY OF THE INVENTION

Accordingly, it is an object of this invention to provide a system and process which will allow a viewer to receive supplemental graphical information related to a television program.

It is another object of the invention to provide such a system and process which will allow the viewer to interact with the combination of the regular program and supplemental information.

It is another object of the invention to provide a question and answer format for said interaction such that specific supplemental graphical information the viewer sees depends upon his correctly answering the questions.

It is another object of the invention to induce viewers, children in particular, to participate in this educational interaction by providing a game-like series of rewards after each correct answer such that a complete set of rewards, for example, will entitle a child to see his or her name and hometown displayed on a television.

It is another object of the invention to provide such a system and process which will be invisible to the viewer who may not be equipped with the decoding equipment necessary to see supplemental information.

It is another object of the invention to provide such a system and process in which, at designated times, the regular television program may comprise two distinct programs multiplexed according to the even or odd television fields, and the decoding equipment will display either the even or odd field, depending on the nature of answers to questions.

These and related objects may be accomplished by a novel system and process which may be called closed graphics decoding (CGD), in an analogous fashion to closed caption decoding. The interactive capability with the use of the joystick input device enhances the system. A system and process for CGD in accordance with this invention has a broadcast receiver, a graphics/text overlay generator connected to said receiver, and a television monitor connected to the overlay generator. A joystick input device connected to the graphics/text overlay generator provides the viewer interactive capability.

Other features and advantages not found in existing inventions will be better understood from the following detailed description, together with the appended claims and the attached drawings.

BEST MODE FOR CARRYING OUT THE INVENTION

According to a first embodiment of the present invention, an amusement device may enable a television viewer to express a variety of opinions and humor in a direct and satisfying fashion. With the first embodiment, a viewer may use a joystick input device to select an overlay image from a library of such images. The joystick input device may comprise a two-axis joystick which may also include four additional buttons which may be used in combination to activate various functions.

A viewer may access overlay images rapidly through direct observation of images superimposed over background video. When a viewer sees an overlay image deemed suitable for current background video, a viewer may then position an overlay image over background video so as to set up humorous or otherwise expressive effects. To maintain position of an overlay image with respect to backgraund video (and sustain an expressive effect), a viewer may use a joystick to position an overlay image on a television screen so as to track background video.

A viewer's enjoyment or tolerance of television programming may be enhanced by such overlay images. Some of the enjoyment may be analogous to enjoyment derived from adorning faces on magazine covers with abundant facial hair, inappropriate attire, or dental defects.

In the first embodiment, overlay images may also include cartoon thought balloons. In such thought balloons, phrases of appropriate subject matter may be inserted to give an appearance of revealing innermost thoughts of a television personality. The first embodiment of the present invention may not only provide predetermined phrases for rapid access but may also allow a viewer to compose his or her own phrases letter by letter in typewriter fashion.

A viewer may also use a phrase composition feature to compose captions or titles which may exist outside the thought balloons. In the first embodiment, a viewer may use a combination of joystick control buttons to select a letter from the alphabet displayed on a television. However, a typewriter keypad control may be used to select characters without departing from the spirit and scope of the invention.

The first embodiment of the invention may further allow a viewer to place on the television screen any number of supplied overlay images, erase portions of images, make additions to images, paint new images from scratch with coarse or fine paintbrushes. In addition, the first embodiment of the present invention may allow a viewer to blank background video to draw on a black screen and/or hide selected overlay images and drawings and make them reappear instantly for a surprise unveiling. Overlay images may be moved off screen in one direction and then reenter the screen from another direction to give an added dimension of playfulness.

There may be many potential applications of the first embodiment of the present invention. For example, as the first embodiment of the present invention may use as input any source of background video, overlay images may be placed over broadcast or cable TV signals, recorded video, or video games. Further, as the first embodiment of the present invention may provide as output the same standard video signal type which was input, an output signal may be further processed or recorded.

For example, a viewer may add imagery to an existing video game a friend may be playing to provide additional challenge to the player. In addition, a viewer may also create new own video games with prerecorded professional or home videos. Two or more units of the present invention may be cascaded so many viewers may compete or cooperate with one another in their creativity.

Both the first and second embodiments of the present invention may also be used as an educational tool in conjunction with video teaching programs which encourage a viewer to call up words, letters, numbers, or other imagery appropriate to the context. Alternative input devices may be used to enable very young children to control the functions of the invention. For example, a xylophone, piano, or alphabetic keyboard input device may be used with teaching videos for children. Such an implementation may be an introduction to music in which the child produces a tone on the xylophone, and the corresponding musical note appears on the screen where the teacher may be pointing.

Another application of the first and second embodiments of the present invention may be as a video message decoder used in conjunction with background video created for this purpose. Background video may comprise, for example, a picture or a printed message which may be superimposed with an apparently random distribution of obscuring patterns prior to delivery to a viewer. The resultant video may thus be encoded as it may not be recognized by an unprepared viewer. A library of overlay images may contain a selection of decoding overlays, one of which may have a distribution of patterns corresponding to an encoding pattern. This decoding pattern may be suitably aligned on background video, and a picture or message may thus be decoded. Such a system may be used in a contest, for example, to encourage viewers to "stay tuned," so they may decode all of the encoded messages which may be periodically broadcast.

Figure 1:
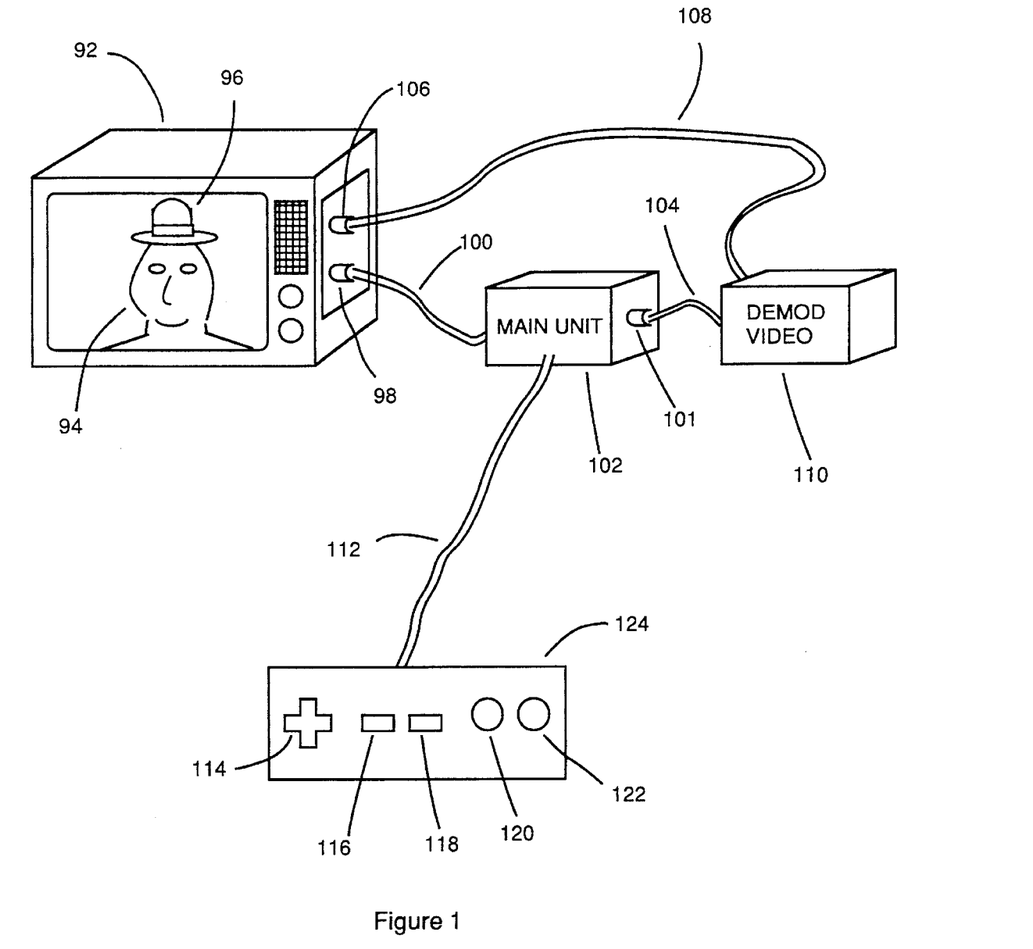
FIG. 1 illustrates the manner in which the first embodiment of the present invention may be coupled to a television and to a source of background video.

In the first and second embodiments of the present invention, as shown in FIG. 1, the apparatus may comprise two units. The main unit 102 may contain stored overlay images, circuitry which synchronizes overlay images with background video, and logic which may implement features of the first and second embodiments of the present invention.

The second unit may be a joystick input device 124, which may allow a viewer to send commands to main unit 102. Main unit 102 may use video source 110 to generate background video 94 on television 92. Main unit 102 may readily attach to television 92 and video source 110 with standard cabling. Joystick control 124 may attach to main unit 102 with a simple cable, or may be provided with infrared, ultrasonic, RF or other wireless link.

Referring to FIG. 1, a source of demodulated video 110 such as a video cassette recorder (VCR), cable converter, or satellite converter may be coupled to main unit 102 by means of phono jack 101 and cable 104. Demodulated video source 110 may also supply demodulated audio directly to television receiver 92 by means of phono jack 106 and cable 108. Main unit 102 may combine background video 94 with an overlay image 96 (e.g., a hat as shown).

The combination of background video 94 with an overlay image 96 (combined video) may be supplied to television 92 by means of phono jack 98 and cable 100. Main unit 102 may be controlled by means of joystick 124 connected to main unit 102 by means of cable 112.

In the first embodiment of the present invention, joystick buttons may be pressed in combination to signal main unit 102 to perform one of a number of functions. Examples of these functions include:

(1) scan an electronic library of overlay images and to select a particular overlay image;

(2) move the selected overlay image relative to background video;

(3) control additions to and deletions from the overlay image in a painting fashion;

(4) control selection of the colors which may be applied in the painting fashion;

(5) combine multiple overlay images from the library of overlay images;

(6) temporarily hide background video such that overlay images may be modified without distractions from background video;

(7) temporarily hide overlay images so overlay images may be used to surprise an unsuspecting viewer;

(8) select text to be displayed as a caption or in a cartoon thought balloon;

(10) select a color of text; or (11) move text into an appropriate position for a caption or a thought balloon.

A position of overlay image 96 may be controlled by button 114. Selections from a library of overlay images may be controlled by holding down button 120 while pressing up or down positions on button 114. Background video 94 may be temporarily hidden or restored by button 118.

Figure 2:
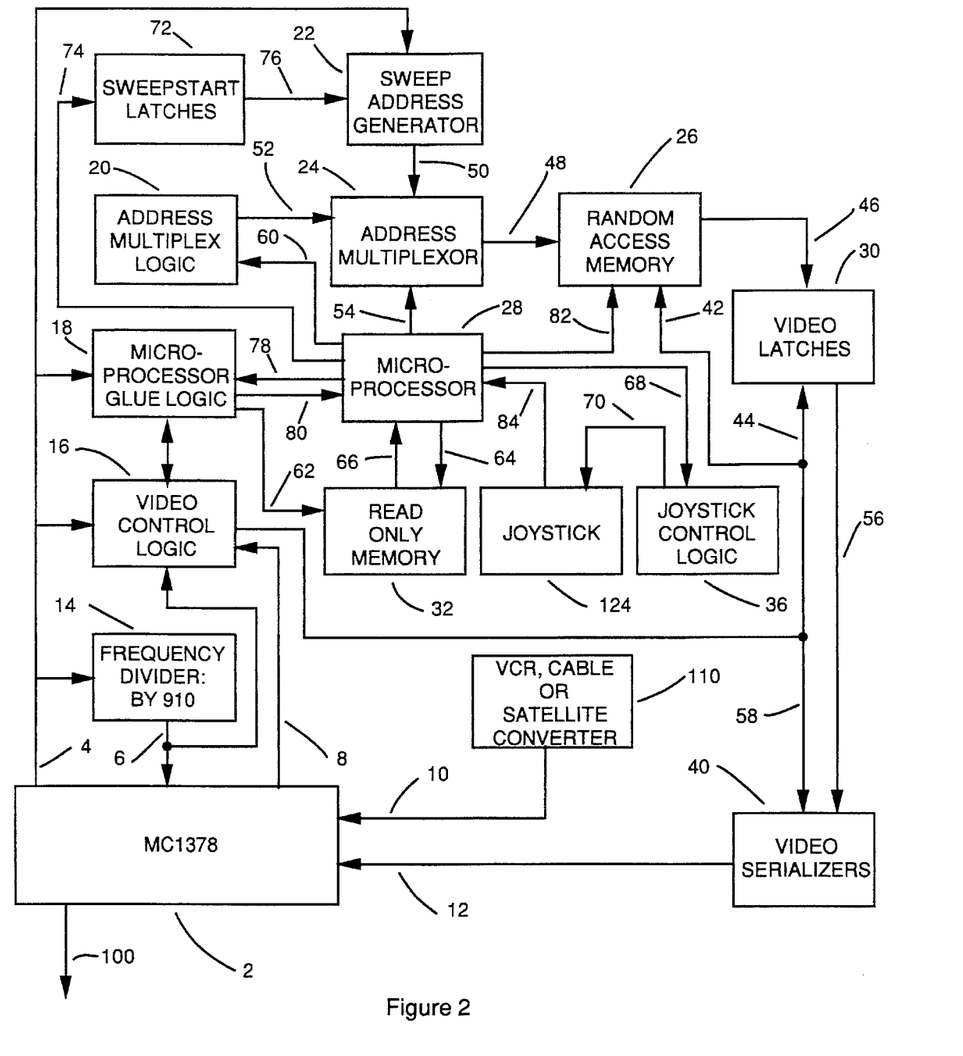
FIG. 2 is a functional block diagram of the electronic circuitry and digital logic of the first embodiment of the present invention.

Operation of the first embodiment of the present invention may be understood with reference to the block diagram of FIG. 2. Synchronization of overlay image 96 with background video 94 may be accomplished by means of a phase-lock unit 2 such as a Motorola MC1378. Application notes provided with the Motorola MC1378 provide detailed schematics for one skilled in the art to implement a working device. Phase-lock unit 2 may separate horizontal synchronization pulses (HS pulses) and vertical synchronization pulses (VS pulses) from baseband video 10 which may be supplied by demodulating unit 110. HS and VS pulses are shown in FIG. 2 as output 8 from phase-lock unit 2.

Phase-lock unit 2 may generate system clock 4 at a frequency of 14.31818 MHz by means of an internal voltage-controlled oscillator (VCO). System clock 4 may be supplied to frequency divider 14 such as a cascade of 74LS163 synchronous counters. Frequency divider 14 may divide system clock 4 by 910 to an approximate horizontal synchronization frequency of 15.7326 kHz. Frequency divider 14 may then generate pulse 6 which may approximate a standard horizontal synchronization pulse, hereinafter referred to as AHS pulse 6. AHS pulse 6 may be returned to phase-lock unit 2. A phase comparator in phase-lock unit 2 may compare a phase of AHS pulse 6 with a horizontal sync pulse and generate a suitably-filtered error signal for controlling the VCO. The VCO thus may maintain a system clock 4 which may be synchronous with horizontal synchronization of background video 94.

AHS pulse 6, HS and VS pulses 8, and system clock 4 may be supplied to video control logic 16. Video control logic 16 generates row address strobe, column address strobe, and read/write signals 42 for random access memory (DRAM) 26. Row address strobe, column address strobe, and read/write signals 42 allow read and write access to desired memory locations in DRAM 26. DRAM 26 receives address 48 from address multiplexor 24 (e.g., 74LS157), which may select between sweep address 50 (e.g., a cascade of 74LS163 synchronous counters) or microprocessor address bus 54. Address multiplexor 24 receives select signal 52 from address multiplexing logic 20, whose video mode 60 may be set by microprocessor 28. A video mode may have two states, sweep mode and processor mode.

In sweep mode, address multiplexor 24 passes DRAM 26 addresses 48 from sweep address generator 22, which may begin its sweep through an address range for a VS pulse. This sweep through DRAM 26 addresses may be synchronized with background video 94 and thus may cause DRAM 26 to generate red, green, blue, and overlay data 46 (video data) to produce an overlay image 96.

Video data may be latched by video latches 30 (e.g., 74LS75) whose strobe signals 44 may be generated synchronously with video data by video control logic 16. Latched video data 56 may be supplied to video serializers 40 (e.g., 74LS195A). Video serializers 40 receive pixel clock 58 from video control logic 16, which may have synchronized pixel clock 58 to system clock 4 and thus to background video 94. Serialized red, green, blue, and overlay data 12 may be supplied to red, green, blue, and overlay enable inputs of phase-lock unit 2. Depending on the state of an overlay enable input from joystick 124, phase-lock unit 2 selects between background video 94 and overlay image 96, as defined by red, green, and blue data.

In processor mode, address multiplexor 24 passes DRAM 26 addresses 48 from microprocessor 28. Processor mode may be used by microprocessor 28 to read from or write to DRAM 26 in order to manipulate contents of DRAM 26 and thus to change a form of overlay image 96. Microprocessor 28 supplies read, write, and memory cycle signals 78 to microprocessor glue logic 18.

Microprocessor glue logic 18 supplies chip enable signal 62 to read only memory (ROM) 32. Microprocessor 28 also supplies the program address 64 to ROM 32, and ROM 32 returns program opcode 66 to microprocessor 28. Microprocessor glue logic 18 also supplies a video blanking signal 80, derived from a VS pulse and AHS pulse 6, back to microprocessor 28. Program logic of microprocessor 28 may use the VS pulse to ensure DRAM 26 accesses may be made only during a vertical blanking period, so as to avoid creating video snow.

The apparent position of an image on a video screen may be moved by changing a starting address of a sweep through video memory, here shown as latched sweepstart address 76.

Microprocessor 28 supplies sweepstart address 74 to sweepstart latches 72 (e.g., 74LS259). Sweepstart latches maintain latched sweepstart address 76 for sweepstart generator 22.

Microprocessor 28 initiates a joystick read sequence by sending a joystick request signal 68 to joystick control logic 36. Joystick control logic 36 in turn sends clocking signal 70 to joystick 124 (e.g., parallel to serial converter such as 74LS195A). Joystick 124 returns a series of pulses 84 to microprocessor 28 to indicate which joystick buttons may be depressed.

The first embodiment of the present invention describes a method and apparatus for generating arbitrary graphical and/or text overlay images. The second embodiment of the present invention combines the novelty of such arbitrary text and graphics with a system and process to deliver custom graphics and text which relate directly to background video 94. Joystick 124 may allow a viewer may interact with combined video, text, and/or graphics.

The second embodiment of the present invention may provide a very powerful combination of video and custom text and graphics. This system and process bring, in a compelling fashion, the Socratic educational method into the realm of everyday television viewing of children and adults. Furthermore, it does so in a game-like fashion which appeals especially to children. One advantage of the second embodiment of the present invention is supplemental text and graphics may be invisible to viewers who may not be provided with a suitable decoder.

A variation on the second embodiment of the present invention may use an interlace multiplexing method in which two different video programs may be presented on the odd and even fields. Depending on a viewer's answer to a question, a decoder may display either an odd or even field. Using such a multiplexing system under most circumstances may create a video picture which may be confusing to a viewer without a decoder. Further, if a decoder displays only an even or odd field, with the other field being blank, a picture may have only half the normal resolution and may flicker. These disadvantages may not be so great if interlace-multiplexing is used periodically for short periods of time.

If background video 94 is a cartoon, however, such disadvantages may be overcome in part with the addition of a frame grabber. In a cartoon, it may be possible to create a video picture, for example in which an even frame shows a character in red, for example, and an odd frame shows the same character in blue. The full video picture would approximate the character in purple, with some artifacts, but might not look unusual in the context of a cartoon. Thus, in a cartooning context, the present system and process may combine overlay graphics, text, and interlace multiplexing.

One way to send supplemental data may be during a vertical blanking interval (VBI) of a video signal in a similar fashion to closed-caption or teletext data. Closed caption systems send ASCII character data in the vertical blanking interval (VBI) on line 21 of odd fields at a data rate averaging 480 baud over a number of frames. Such ASCII character data may represent closed-caption text and control commands for a closed-caption decoder, and a decoder may interpret the character data accordingly.

The second embodiment of the present invention may combine the information transmission ability of closed-caption (or similar but higher data rate) technology with graphics technology the first embodiment of the present invention. The second embodiment of the present invention may receive data over another line of the VBI and interpret such data as graphics. For the purposes of this application, such data is referred to as "closed graphics data". The data rate and format for closed graphics data may be the same as closed caption data or an alternate format may also be used within the spirit and scope of the invention. In the second embodiment of the present invention, main unit 102 of FIG. 1 may be configured as a closed-graphics decoder 102.

The second embodiment of the present invention may have important applications, for example, in educational interactive television for children. During science or nature programming (for children or adults), for example, closed-graphics data may be sent to homes equipped with closed graphics decoder 102. Such information may comprise, for example, graphics and questions which may relate to a television program, together with graphics which show, at an appropriate time, a correct answer and a reward for the correct answer.

When the closed-graphics decoder of the present invention is activated, a viewer (e.g., child) may see overlay questions and graphics. The questions may be multiple choice or a type which may require a viewer to select a correct graphic from a graphic library. A viewer may respond to questions with joystick input by moving a pointer to a correct multiple-choice answer or by selecting a correct graphic from a library of graphics images. The closed-graphics decoder of the present invention may receive a correct answer and reward data as closed graphics data and store such data in DRAM 26.

If a viewer answers a question correctly, the closed-graphics decoder of the present invention may display a reward as a graphical or word clue which the viewer may note down.

Such an apparatus and system may be used to stimulate learning in viewers. For example, over the course of a 30 minute program, two dozen or so such questions, answers, and clue rewards may be transmitted. At the end of the program, a viewer may call a telephone number (e.g., 800 number) to give his or her answer based on reward clues. The first 10 viewers who call with the correct answer, for example, may have their names and hometown displayed as graphical images displayed by the closed graphics decoder 102 on television 92. All viewers using a closed graphics decoder 102 tuned to the same channel may be able to view the names and home towns of the winners.

Figure 4:
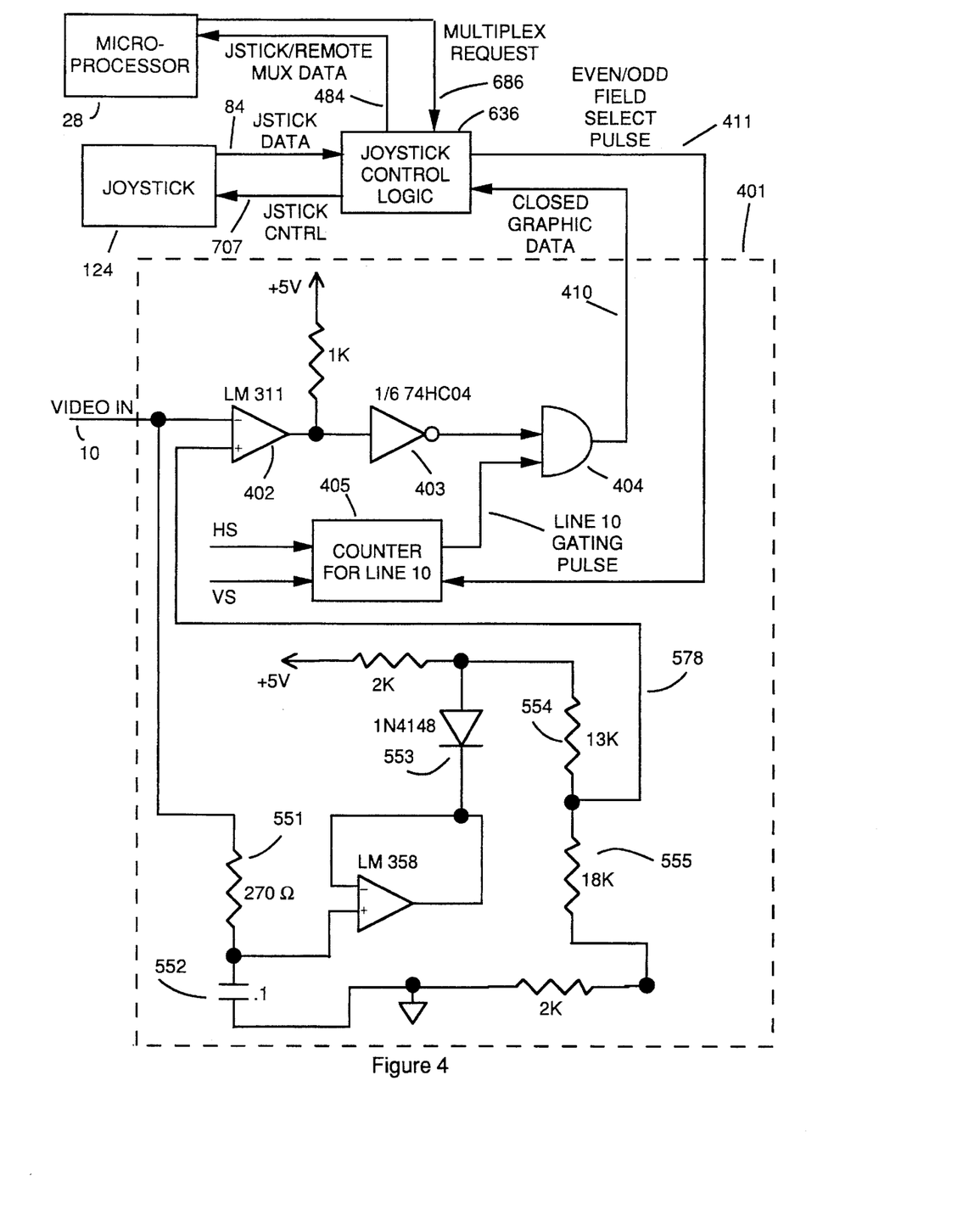
FIG. 4 is a block diagram of circuitry used in conjunction with a second embodiment of the present invention.

FIG. 4 is a block diagram illustrating how elements of the apparatus of FIG. 2 may be modified to operate as a closed graphics decoder 102. Thus, the second embodiment of the present invention may include all of the elements of FIG. 2 combined with additional elements as illustrated in FIG. 4. For the sake of illustration, those elements of FIG. 2 which are not modified in the second embodiment of the present invention are not shown in FIG. 4.

FIG. 4 illustrates how a decoder for capturing closed graphics data may be combined with a microprocessor 28, joystick 124 and joystick control logic 36 of FIG. 2. Closed graphics data may be provided in the vertical blanking interval before the 21st horizontal line for example line 10. Decoder 401 may capture line 10 under a variety circumstances. Demodulated video signal 10 may be input to LM311 comparator 402 which may compare demodulated video signal 10 to threshold voltage 578. Threshold voltage 578 may be derived by averaging the color burst carrier to obtain a true 0 IRE level. An RC network of 270 Ohm resistor 551 and 0.1 micro farad capacitor 552 average the color burst carrier to produce a video blanking level at 0 IRE. A reference voltage equal to a 0.5 volt drop across diode 553 (e.g., 1N4148 diode) may then be voltage divided by 13 Kilo Ohm resistor 554 and 18 Kilo Ohm resistor 555 to give a comparison threshold of about 2.9 Volts.

Decoder 401 thus averages a color burst signal to obtain a true 0 IRE level and add a reference voltage to obtain a threshold which accurately tracks the blanking level. Signals output from comparator 402 are buffered and inverted by inverter 403. Counter 405 counts line 10 of the vertical blanking interval and gates data through AND gate 404. Even/odd field select pulse 411 provides an offset signal to counter 405 to compensate for a half line offset between even and odd fields. Thus, only closed graphic data is output as signal 410.

Software in microprocessor 28 may also decide whether microprocessor 28 takes its command from joystick 124 or remote commands from closed graphics data 410. Joystick control logic 636 may multiplex joystick data 84 with gated closed graphic data 410 to produce joystick/remote multiplexed data 484 in response to multiplex request signal 686 from microprocessor 28. Joystick control logic 636 may also send joystick control signal 707 to joystick 124 and receive joystick data 84 as in the first emnbodiment of the present invention. Thus, microprocessor 28 may receive both joystick control signal as well as closed graphics data.

In the second embodiment of the present invention, remote commands may be sent to the closed graphics decoder of the present invention to set up a question and associated graphics. Control may be then handed over to joystick 124, so the viewer may respond to a question. The nature of the response may determine answer graphics displayed and whether a reward graphical clue may be displayed. Control may be then passed back to remote commands received from gated closed graphic data 410 for a next question.

In a third embodiment of the present invention, phases of horizontal or vertical synchronization pulses may be varied to produce additional video effects. Variable synchronization delay of horizontal synchronization (VSD) produces a phase shift of horizontal lines, which may vary from line to line. The visual effect of VSD may be to warp background video 94 or an overlay image in a manner similar to a fun-house mirror. The effect on a close-up image of a face may make the jowls bulge or the nose crooked.

The third embodiment of the present invention may achieve this variable synchronization delay by moving overlay image 96 off screen such that horizontal synchronization may be delayed to a different degree from one horizontal line to the next to produce horizontal distortions of a picture in the form of a fun-house mirror.

Figure 3:
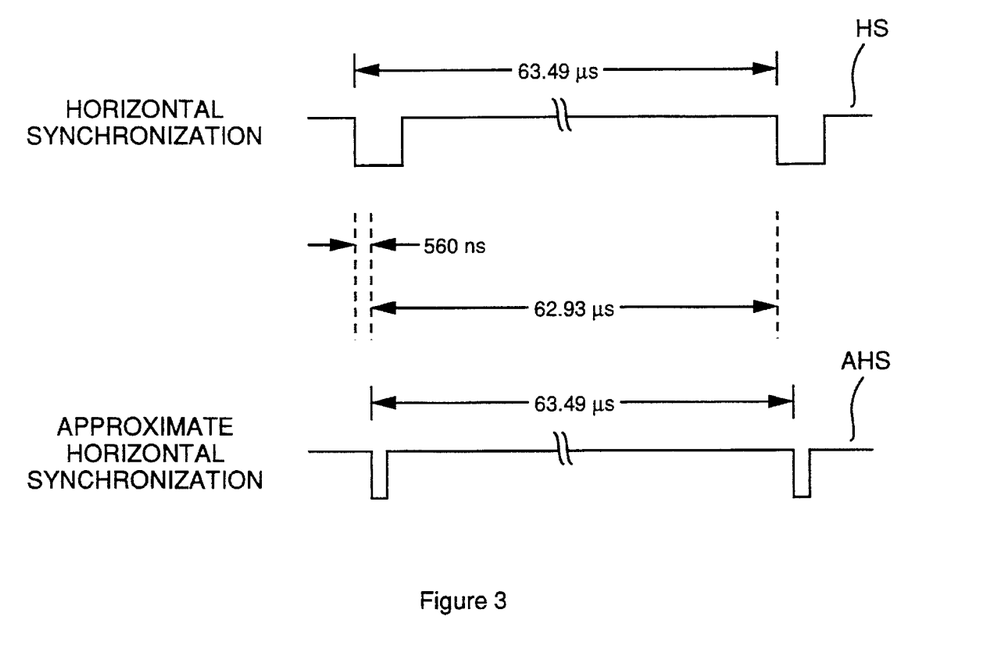
FIG. 3 illustrates a comparison between the horizontal synchronization pulse train and the approximate horizontal synchronization pulse train for a third embodiment of the present invention.

The difference between the HS pulse and AHS pulse 6 may be the basis for a feature of the invention called variable synchronization delay (VSD). VSD may be an apparent warping of an image due to a line-to-line shift of the phase of the horizontal synchronization. VSD may be understood more clearly with the help of the example timing diagram of FIG. 3. FIG. 3 shows a comparison of a standard HS pulse train with AHS pulse train (6 in FIG. 2). The two waveforms may be phase locked at the horizontal frequency, but the pulse widths may not be the same. The edge of the AHS pulse 6differs from the edge of the HS pulse by 560 ns in the example.

As mentioned previously, phase-lock unit 2 will select either background video 94 or overlay image 96 depending on the state of its overlay enable pin. The state of the overlay enable pin during the horizontal synchronization period also determines the selection of the HS or the AHS 6. This state of the overlay enable pin may change from line to line; therefore, the horizontal synchronization may be variably delayed from line to line.

Coding of video signals with information in the vertical blanking interval may be achieved using a commercially available closed-captioning apparatus. various ASCII characters may be inserted into a video signal as closed-captioning information. The characters, by themselves, do not spell out closed-captioning words, but rather represent by themselves or in combination commands to the closed-graphics decoder.

Thus, for example, an individual ASCII character may represent selection of particular graphical image stored in read only memory 32. Other ASCII characters may represent commands for positioning a graphical image as an overlay on a screen. Alternately, a pseudo code may be generated using combinations of ASCII characters to select and move images. Alternately, a closed-captioning encoder may be suitably modified to provide such information in other portions of the vertical blanking interval such that closed captioning information is not disrupted by closed-graphics information.

Moreover, other in-band and out-of-band data transmission techniques are known in the art for providing supplemental data within a television signal. Such techniques may be adapted to transmit closed-graphics information without departing from the spirit and scope of the invention.

In addition, it should be noted that microprocessor 28 may be readily adapted to provide functions such as scoring and the like for gaming applications.

Various gaming and educational applications may be implemented using the apparatus and system of the present invention. In a first educational gaming embodiment, a graphics image forming a cartoon character (e.g., "Dr. Video™" the educational owl) may be stored along with other graphical images in ROM 32. Such graphical images may be provided within ROM 32 during manufacture of the interactive device. Alternately, images may be altered, changed, or updated by replacing ROM 32 or providing a removable "Smart Card" or the like. Alternately, graphical images may be provided in RAM 26 by downloading such images from disk, telephone line (i.e., modem) or through closed-graphics data.

The cartoon character of Dr. Video may be made to "fly" across the screen by transmitting closed-graphics commands with a television image to control microprocessor 28 to continuously reposition the image. Alternately, or in addition, the cartoon character may be animated by rapidly altering images from frame to frame (or in groups of frames) so as to show, for example, movement of wings.

Simultaneously, a word clue may appear at the bottom of the screen. The word clue may be generated by closed-graphics information or by traditional closed-captioning techniques. The word clue may comprise a single word, or may comprise a question. Three or more multicolored "nuggets" may appear on the TV screen, overlaying or outlining objects in the background video. A player may identify a nugget which may be relevant to the word clue by positing the Dr. Video character using joystick 124. After a word clue appears, closed-graphics information may be transmitted to the interactive device returning positioning control to the viewer. Alternately, user may select a clue by selecting a nugget using joystick 124.

If the player selects the correct nugget, the nugget turns yellow (or other contrasting color) to indicate a golden nugget and the player is awarded a point. Indication of what is the correct answer is transmitted to microprocessor 28 as closed-graphics information. Microprocessor 28 may be programmed to keep score of points and display a score and graphical information on the TV screen. If a player chooses an incorrect nugget, the correct answer is indicated and a point is deducted.

Alternately, if a viewer selects too many incorrect answers, the video screen may be blanked for a predetermined period of time.

In such a gaming application, microprocessor 28 may keep track of a player's score. At the end of a "game" or program, microprocessor 28 may receive a series of codes as closed-graphic information. Each code may correspond to a score or range of scores. A player's score may be displayed on the TV screen, together with a code for that score. A player may then call a phone number (e.g., 1-800 number) indicated on the screen and report the score and code for confirmation.

Names of a first number of players (e.g., 10 or 100 or the like) may then be transmitted as closed-graphics information to microprocessor 28. Thus, each viewer using the apparatus of the present invention may see a list of winning players at the end of the "game" or television program.

It should be noted that the gaming application of the present invention may be provided with any suitable traditional background video. For example, closed-graphics information may be provided with a nature program (e.g., Marty Stouffer's Wild America™) or the like to provide a "game" for younger viewers to play in order to improve comprehension and increase attention span. To viewers without the apparatus of the present invention, such graphical information is not visible.

Alternately, or in addition, such closed-graphics information may be provided with other types of video programming (e.g., sitcom, movie or the like) to provide educational or humorous interaction for the viewer. For example, graphical characters may be superimposed using closed-graphics information to provide humorous situations and/or commentary of a background movie in a similar manner to such programs as Mystery Science Theater 3000™ or the like.

Moreover, such closed graphics information may be provided on a program videotape, laser disc, or the like. Such prerecorded programs may be provided expressly for use with the apparatus of the present invention and may be provided for educational and/or gaming purposes.

It will be appreciated from the foregoing that, although an embodiment of the invention has been described in detail for purposes of illustration, various modifications may be made without departing from the spirit and scope of the invention. Accordingly, the invention is not to be limited except as by the following claims.

I claim:

1. An interactive television graphics apparatus comprising:

video input means for receiving a background video signal, said background video signal including at least one graphics control signal for performing one or more of the following functions: selecting a locally generated graphic image overlay component, positioning a graphic image overlay component, and defining a bit map of a graphic image overlay component;

memory means for storing at least one graphic image overlay component, including one or more of: a locally generated graphic image overlay component, and a bit map of a graphic image overlay component received from said video input means; and processor means, coupled to said video input means and said memory means for receiving said graphics control signals and generating a graphic image as an overlay over said background video in response to received graphics control signals, wherein said graphics control signals comprise signals for selecting a graphic image stored in said display means.

2. The interactive television graphics apparatus of claim 1, further comprising:

a user input means, coupled to said processor means, for generating user graphics control signals in response to a user input, wherein said processor means receives said user graphics control signals and generates a graphic image as an overlay over said background video in response to received locally generated graphics control signals.

3. The interactive television graphics apparatus of claim 1 wherein said graphics control signals comprise signals for selectively positioning a graphic image stored in said memory means.

4. The interactive television graphics apparatus of claim 2 further comprising:

synchronization means, coupled to said video input means, for generating synchronization signals from said background video signal;

address generator means, coupled to said memory means, said processor means and said synchronization means for selectively generating memory addresses for said memory means in response to said processor means and in synchronization with said synchronization means; and video output means, coupled to said memory means, for selectively reading graphic image data from said memory means in synchronization with said synchronization means and merging said graphic image with said background video image.

5. The interactive television graphics apparatus of claim 4, wherein said user input means comprises:

position input means, actuatable by a user, for generating a position signal to position an image on a display.

6. An interactive television graphics apparatus comprising:

video input means for receiving a background video signal including graphics control signals;

memory means for storing at least one graphic image;

processor means, coupled to said video input means and said memory means for receiving said graphics control signals and generating a graphic image as an overlay over said background video in response to received graphics control signals;

a user input means, coupled to said processor means, for generating user graphics controls signals in response to a user input;

synchronization means, coupled to said video input means, for generating synchronization signals from said background video signal;

address generator means, coupled to said memory means, said processor means and said synchronization means for selectively generating memory addresses for said memory means in response to said processor means and in synchronization with said synchronization means;

video output means, coupled to said memory means, for selectively reading graphic image data from said memory means in synchronization with said synchronization means and merging said graphic image with said background video image; and second memory means, coupled to said processor means, for storing a plurality of graphic image data representing a plurality of overlay images, wherein said processor means receives selected overlay image data corresponding to a selected image from said second memory means and stores the selected overlay image data in said first memory means;

wherein said processor means receives said user graphics control signals and generates a graphic image as an overlay over said background video in response to received locally generated graphics control signals, and wherein said user input means comprises position input means, actuatable by an user, for generating a position signal to position an image on a display.

7. The interactive television graphics apparatus of claim 6, wherein said user input means comprises:

a first switching means, selectively actuatable by an user, for generating a signal to sequentially display each of said plurality of overlay images when actuated.

8. The interactive television graphics apparatus of claim 7, wherein said user input means further comprises:

a second switching means, selectively actuatable by an user, for generating a signal to select a displayed overlay image as a selected overlay image.

9. The interactive television graphics apparatus of claim 7, further comprising:

a start latch, coupled to said processor means and said address generating means, for storing a start address from said processor such that said address generating means selectively generates memory addresses for said memory means from said start address.

10. The interactive television graphics apparatus of claim 9, wherein said processor means receives said position signal from said user input means and said graphics control signals, and changes said start address in said start latch such that a selected image will overlay said background image in a position corresponding to said position signal.

11. A method for inserting an overlay image onto a background video image, comprising the steps of:

receiving a background video signal, said background video signal including at least one graphics control signal for performing one or more of the following functions: selecting a locally generated graphic image overlay component, positioning a graphic image overlay component, and defining a bit map of a graphic image overlay component, storing at least one graphic image overlay component, including one or more of a locally generated graphic image overlay component and a received bit map of a graphic image overlay component, generating a graphic image as an overlay over said background video in response to received graphics control signals, generating synchronization signals from said background video signal, receiving an input command from a user to select an overlay image, generating overlay image data in response to said input command and storing said overlay image data in a first memory, selectively generating memory addresses for the first memory in synchronization with said synchronization signals, and selectively reading the overlay image data from the first memory in synchronization with said synchronization signal and merging said overlay image with said background video image.

12. The method of claim 11, wherein said step of receiving an input command from a user comprises the step of:

actuating a position input by an user to generate a position signal to position an image on a display.

13. A method for inserting an overlay image onto a background video image, comprising the steps of:

receiving a background video signal including graphics control signals, storing at least one graphic image, generating a graphic image as an overlay over said background video in response to received graphics control signals, generating synchronization signals from said background video signal, receiving an input command from an user to select an overlay image, generating overlay image data in response to said input command and storing said overlay image data in a first memory, selectively generating memory addresses for the first memory in synchronization with said synchronization signals, selectively reading the overlay image data from the first memory in synchronization with said synchronization signal and merging said overlay image with said background video image;

storing a plurality of overlay image data in a second memory representing a plurality of overlay images, and receiving an input command from an user to select an overlay image from said plurality of overlay images and storing the selected overlay image data in the first memory;

wherein said step of receiving an input command from an user comprises the step of:

actuating a position input by an user to generate a position signal to position an image on a display.

14. The method of claim 13, wherein said step of receiving an input command from a user comprises the step of:

selectively actuating a first switch by an user to generate a signal to selectively display any of said plurality of overlay images.

15. The method of claim 14, wherein said step of receiving an input command from a user further comprises the step of:

selectively actuating a second switch by a user to generate a signal to select a displayed overlay image as a selected overlay image.

16. The method of claim 13, further comprising the step of:

storing a start address such that said address generating step selectively generates memory addresses for the first memory from said start address.

17. The method of claim 16, further comprising the steps of:

receiving the position signal from a user, and changing said start address such that the selected image will overlay said background image in a position corresponding to said position signal.

* * * * *

UNITED STATES PATENT AND TRADEMARK OFFICE
CERTIFICATE OF CORRECTION

PATENT NO. : 5,610,665
DATED : March 11, 1997
INVENTOR(S) : John L. Berman

It is certified that error appears in the above-identified patent and that said Letters Patent is hereby corrected as shown below:

Claim 1, last line, delete " display means" and insert -- memory means --.

Signed and Sealed this

Ninth Day of February, 1999

Attest:

Attesting Officer

*Acting Commissioner of Patents and Trademarks*